United States Patent [19]

Foulk

[11] Patent Number: 5,655,854
[45] Date of Patent: Aug. 12, 1997

[54] METHOD OF MACHINING CYLINDER BORES IN ENGINES AT OPERATING TEMPERATURE

[76] Inventor: Richard Arlo Foulk, 9514 Spiralwood Ln., Houston, Tex. 77086

[21] Appl. No.: 524,589

[22] Filed: Sep. 8, 1995

[51] Int. Cl.⁶ .................................. B23B 35/00; B23P 6/02
[52] U.S. Cl. ...................... 408/1 R; 29/888.06; 409/136; 451/47
[58] Field of Search .................................. 29/33 R, 405, 29/888.011, 888.06; 409/135, 132, 131, 136; 408/1 R; 451/47

[56] References Cited

U.S. PATENT DOCUMENTS

| | | | |
|---|---|---|---|
| 2,125,106 | 7/1938 | Gehret | 29/405 |
| 4,117,633 | 10/1978 | Yother | 451/47 |
| 4,653,161 | 3/1987 | Sanchez | 29/888.06 |

FOREIGN PATENT DOCUMENTS 632234  11/1949  United Kingdom ................... 29/405

*Primary Examiner*—William R. Briggs
*Attorney, Agent, or Firm*—John P. Halvonik

[57] ABSTRACT

A machining process is shown and described. The process entails removing the water pump from the front of the block and replacing it with a block-off unit. The cylinder head is removed and replaced by left and right torque plates that are attached to each side of the block. The torque plates provide fluid connection of the smaller coolant passages on each side of the block with one another. The boring process is performed on the engine block when such engine block has been heated to a temperature at or near its operating temperature via the fluid passages. A boring machine may enter the cylinder bores thorough larger openings in each torque plate. The main bearing support (caps) can also be align bored during this process.

1 Claim, 2 Drawing Sheets

METHOD OF MACHINING CYLINDER BORES IN ENGINES AT OPERATING TEMPERATURE

BACKGROUND AND FIELD OF THE INVENTION

The invention relates to the field of machining and in particular to a machining process for those cylinder bores found in the vehicle engines. Such a process is done at a temperature that is at or near that of the operating temperature when the engine is running. It is believed that performing such a machining process with the engine block at a temperature at or near the operating temperature of the engine will provide a more precise boring of the cylinders and main bearing supports.

SUMMARY OF THE INVENTION

The machining process described herein comprises removing the water pump from the unit of the block and replacing it with a block-off unit having inlet and outlet passages corresponding to those inlet and outlet cooling passages at the front of the block (normally in connection of water pump and radiator). The cylinder head is removed and replaced by left and right torque plates that are attached to the top of each side of the block. The torque plates provide fluid connection of the smaller coolant passages on each side of the block with one another.

The boring process is performed on the engine block when such engine block has been heated to a temperature at or near its operating temperature. The coolant passages in the engine block are used to transport a heated fluid through the block in order to raise the temperature during the maintaining process.

It is an object of the invention to provide a machining process for boring out cylinders bores and main bearing supports in engines by maintaining the temperature of such engine block at a temperature corresponding to the normal operating temperature of such an engine during the machining process.

Another object is to provide a machining process for cylinder bores and main bearing supports that is more accurate than state of the art machining processes.

Other objects of the invention will become known once the invention is shown and described.

FIG. 1 Parts used in the procees;

FIG. 2 Direction of fluid flow in the block and torque plates;

FIG. 3 Flow diagram including heater.

DESCRIPTION OF PREFERRED EMBODIMENT

Figure 1:
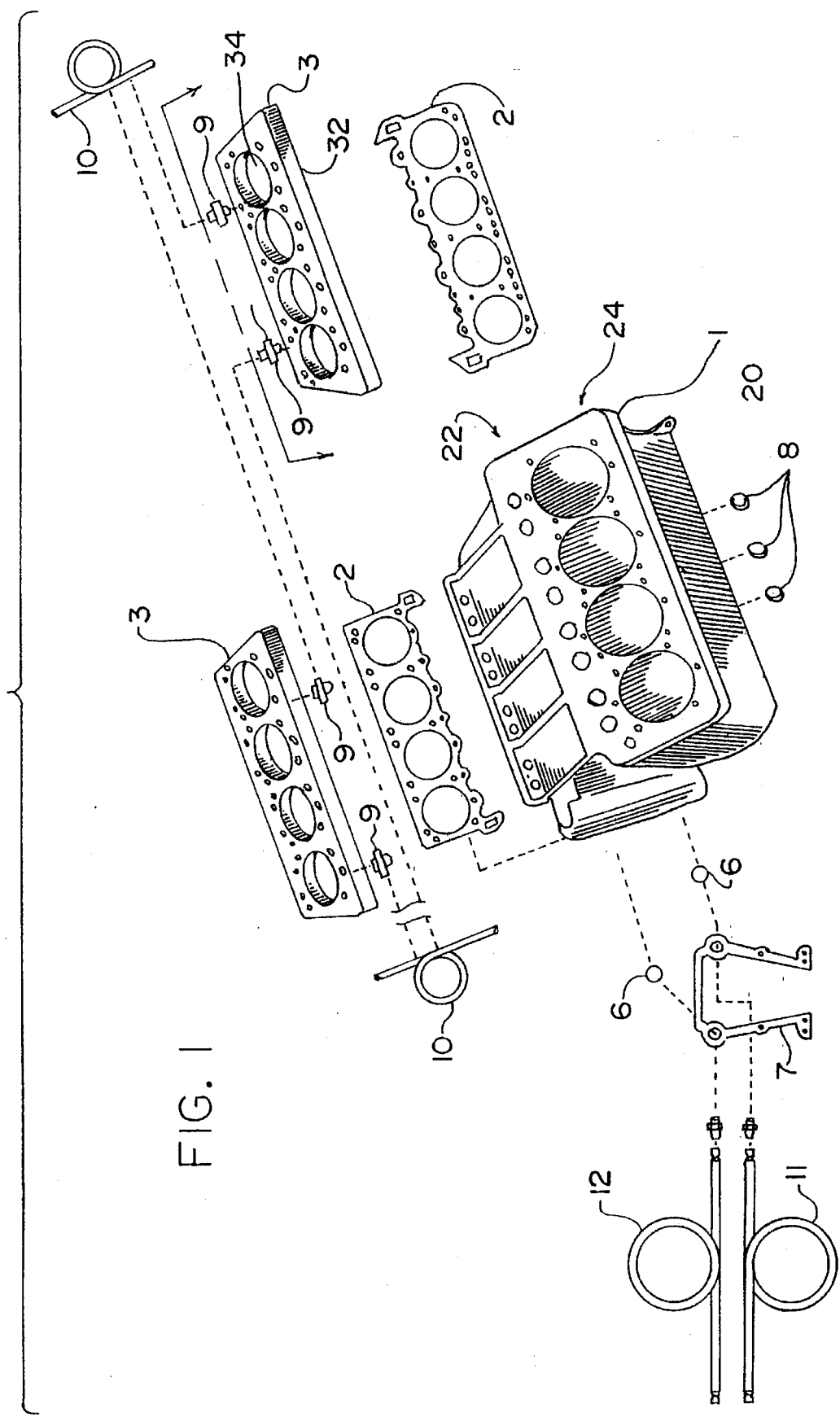

The engine block may be described as having a left and right side as seen in FIG. 1. In the common V-shaped engine each of these sides would have one half of the cylinders of the engine. In other words, in a V-eight engine, each side of the engine would have four of the cylinder bores. The engine shown in the drawings is an eight cylinder engine, however, other engines may be used in the machining process without varying from the spirit of the invention.

Each side of the block has its own interconnected passages for fluid, usually a mixture of commercial antifreeze and water. There are exit and entrance passages in the top surface of each half of the block. Normally the passages in each half are connected to one another by the header when the engine is in use so that fluid may flow through the water plump at the front of the engine, through both sets of passages and exit the block through another opening in the front of the block.

The purpose of the machining process is to rebore the piston cylinder holes and/or the main bearing supports in the engine block and/or the cam bearing bores. Piston chambers may periodically need to be rebored due to engine wear, piston malfunction, deposits, etc.

The bored out cylinder passages 24 in the upper surface of the engine block correspond to the pistons in the engine. There are smaller openings 22 located around these cylinder bores and these correspond with the coolant passages located within the engine block. Such coolant passages are usually interconnected with one another within that half of the engine block. Thus, coolant (usually a mix of water and ethylene glycol when the engine is in use) that enters the engine block at the front of the engine (where the water pump is located) will circulate throughout the engine and exit through an exit passage in the front face of the engine (again where the water pump).

The exit opening at the front of the block is usually in connection with a water pump when the engine is in use. This water pump should be removed before starting the machining process described in order to allow a fluid to be input and output through these larger water inlet and outlet passages.

Cylinder passages are generally bored downward from the upper surface of the engine block and down into the block. After the boring process is complete, an engine cover or header is attached to the top surface of the block in order to keep oil, coolant, etc. from coming out of the engine and to maintain proper compression in the piston chambers.

There are interconnected passages in the block for travel of coolant during engine operation. Such passages have exit and entrance openings 22 in the upper surface of the block and around the larger cylinder bores. These passages in the engine block are used to carry water and oil throughout the inside of the engine. Such water and oil passages would, of course, vary from engine model to engine model. The process herein is based upon using these coolant passages to direct a heated fluid throughout the engine block in order to heat the engine block to a temperature that corresponds to that at which it normally operates.

The front of the engine block usually has an opening for the inlet of water and a separate opening for the exit of water. Usually when the engine is in operation a water pump assembly is connected to the front of the block and in connection to the outlet passage for water. The process herein uses a water pump block-off unit 7 to take the place of the usual water pump. Such block-off unit basically operates as a coupling for fluid lines coming from the heater to the passages in the block.

The block-off unit has an inlet and outlet passage that correspond with the inlet and outlet passage at the front of the engine block. The inlet passage of the block-off unit is connected to an outlet passage 11 coming from the the heater. The outlet passage of the block-off is connected to another portion of the heater where cooled fluid returns to the heater through line 12 in order to be re-heated as needed. O-rings or gaskets 6 may be used between the block-off and front of engine block in order to ensure a substantially water tight fit.

There are two torque plates 3. One for each side of the top of the engine block. Each torque plate has inlet and outlet passages for fluid. The torque plates are built with both large and small apertures that are designed to align with the large cylinder bore holes and the smaller coolant openings. Both of these sets of openings are located in the upper surface of each half of the engine block. Torque plates can be built of different sizes and with different arrangements of apertures in order to correspond to different models of engines.

Each torque plate has a series of large apertures 34 that lead from top to bottom down through the torque plate. Each of these larger holes corresponds to a cylinder bore 24 on that side of the engine. For example, a 6 cylinder engine will have 3 cylinders on each side of the block and hence the torque plates will have 3 large apertures in a line running through the center of the torque plate. The apertures allow a boring means for boring to be inserted through the torque plate and into the cylinder chamber where a matching operation can be carried out.

A series of smaller apertures 32 in each torque plate corresponds to the openings 22 of the coolant passages located in the top surface of each half of the block. The torque plate smaller passages are interconnected with one another in order to fluidly connect those passages in that side of engine block. When the torque plates are attached to the top of the block (with cylinder cover removed) the coolant passages in the block are in fluid connection with one another via the interconnected passages in the torque plate. The passages in each torque plate are connected to one another through lines 10.

The left and right torque plates may be thus connected to one another by lines 10. This allows fluid flow from one plate to the other. Fluid passing into one may then go through the entrance and exit passages for fluid found in the top of the block then through the outlet in the front of the block and finally exit through a passage in the block off unit.

Through the use of the torque plate, the coolant will flow out of exit openings 22 in the upper surface of one side of the block; through the interconnected passages in the torque plate and then to the other torque plate.

Thus when the machining process is to begin, a heated fluid may be introduced through a passage 11 connected to the block-off unit. The fluid then moves through the passages in the block and through exit openings in the top of one side of the block. Such fluid will then enter the torque plates on that side and be directed by line 10 to the torque plate on the other side.

The fluid will then be redirected by passages in the second torque plate through a second set of passages in that side of the engine block. Fluid will then exit through the block off unit on the front of the block and be directed back to the heater. Fluid will return back to the heater by a return line 12. Such return lines may be made of metal or other materials suitable for carrying fluids that may be in the neighborhood of 250° to 300° F.

Figure 2:
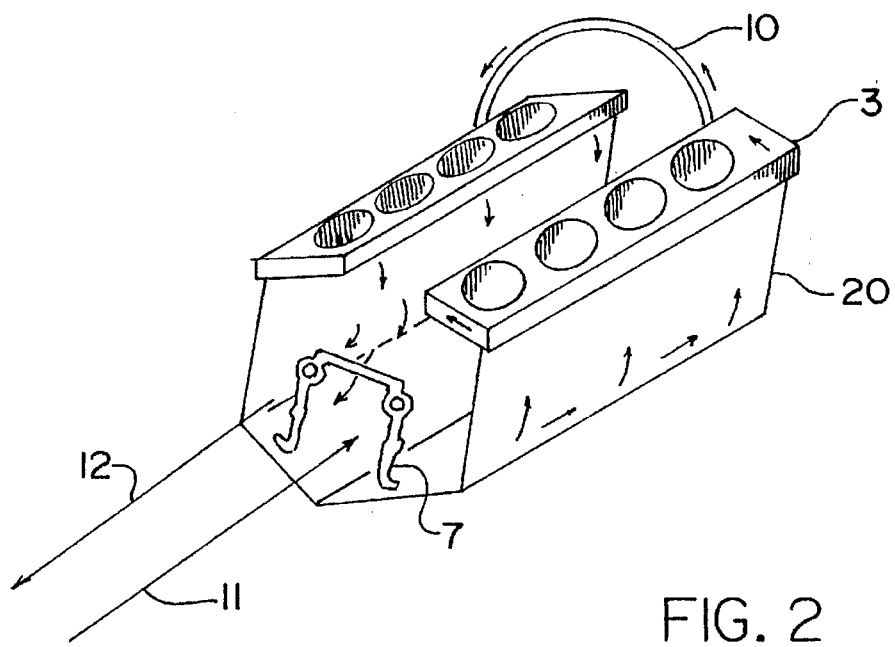

The travel of fluid is shown in FIG. 2. Coolant or other fluid such as the glycol is heated by the heating means 13 and pumped through a line 11. The fluid goes through the block off unit 7 and up through the engine block 20 as the passages in the engine block are connected to the area of the water pump. The fluid exits the top of the block and then enters torque plate 3. Then through line 10 to the other torque plate and down through that plate and into the engine block on the other side. The fluid exits through the passage in the block off unit 7 as this unit is connected to the water passages in the block and returns to the heater through line 11.

Figure 3:
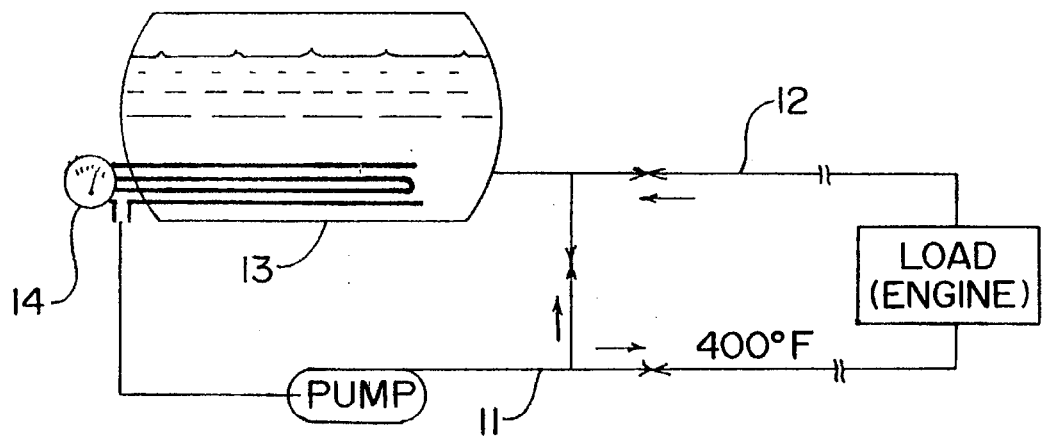

Temperature may be maintained in the block by a feedback control method whereby a sensor (14 in FIG. 3) on the block senses the difference between temperature of the block and the desired temperature (preferably near the operating temperature). Greater or lesser amounts of fluid may be pumped to reach this desired temperature.

A fluid such as ethylene glycol, commercial antifreeze, etc. is heated by a heating means 13 and then run through the engine via an entrance line 11 in connection with a block-off unit attached to where the water pump would normally be on the engine. Heated coolant runs through the passages in the block through the torque plates and back out the block through the exit opening in the front of the engine and then through an exit passage in the block off unit. A return line 12 then brings the fluid back to the heater.

Temperature regulating means may be used to maintain the flow of fluid in the block to insure that the temperature of the block is at or near the operating temperature of the engine. A machining process may then be performed on the cylinder bores of engine by boring means placed through large apertures in the torque plates and into the cylinder bores of the engine. Alignment boring of main bearing supports and/or boring of cam bearings can also be performed with this method. Other machining processes are possible using the apparatus and this method

I claim:

1. A method of machining cylinder bores in the cylinder block of an engine; said engine block having cylinder bores in the upper surface of said block and extending downward, and a series of coolant passages having openings arranged around said cylinder bores, and being interconnected with one another so as to form a fluid passageway; said method comprising the steps of:

A. connecting a block off piece to said front face of said engine, said block off piece having a means for making a substantially water tight seal with said front face;

B. attaching left and right torque plates to said left and right upper surfaces of said engine, said torque plates each having a series of large apertures running through said plates, said large apertures aligned with one another along the center line of said torque plate, said torque plates having a series of smaller apertures in said torque plates, said smaller apertures arranged around said larger apertures, said smaller apertures interconnected with one another so as to form a fluid passageway, said smaller apertures corresponding to said smaller apertures on said upper surface, a portion of said apertures corresponding to said exit openings in said upper surface of said engine block and another portion of said smaller apertures corresponding to said entrance openings in said upper surface of said engine block, so that when said torque plates are aligned with said upper surfaces said smaller apertures in said torque plates will align with said coolant openings so as to create a fluid passageway connecting said exit openings with said entrance openings;

C. directing a heated fluid from a means for heating fluid through said block off entrance passage and returning said heated fluid back to said means for heating fluid;

D. maintaining the temperature of said engine block at a temperature corresponding to the operating temperature of said engine by varying the amount of heated fluid directed through said engine, E. machining said cylinder bores by placing a boring means through said large apertures and into said cylinder bores.

* * * * *